US008903051B2

(12) United States Patent
Li et al.

(10) Patent No.: US 8,903,051 B2
(45) Date of Patent: Dec. 2, 2014

(54) RETURNING CALLS TO EMERGENCY CALLERS WITHOUT VALID TELEPHONE NUMBERS

(71) Applicant: Verizon Patent and Licensing Inc., Basking Ridge, NJ (US)

(72) Inventors: Mingxing S. Li, San Jose, CA (US); Xuming Chen, San Ramon, CA (US); Priscilla Lau, Fremont, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 13/862,001

(22) Filed: Apr. 12, 2013

(65) Prior Publication Data

US 2014/0307858 A1    Oct. 16, 2014

(51) Int. Cl.
*H04M 11/04*    (2006.01)
*H04M 3/42*    (2006.01)

(52) U.S. Cl.
CPC .......... *H04M 3/42008* (2013.01); *H04M 11/04* (2013.01)
USPC ............................. 379/45; 379/37; 455/404.1

(58) Field of Classification Search
USPC ........................................................... 379/37
See application file for complete search history.

(56) References Cited

U.S. PATENT DOCUMENTS

2009/0253399 A1*  10/2009  Snapp .................... 455/404.1
2013/0188784 A1*   7/2013  Engelke et al. ............... 379/52
2013/0329864 A1*  12/2013  Bjorsell et al. ............... 379/45

* cited by examiner

*Primary Examiner* — Creighton Smith

(57) ABSTRACT

A device is configured to detect an emergency call from a user device associated with a device identifier, the device identifier including information that identifies the user device. The device is configured to detect that the user device is not associated with a valid originating telephone number, based on detecting the emergency call. The device is configured to determine a temporary originating telephone number, based on detecting that the user device is not associated with a valid originating telephone number, and to store an association between the device identifier and the temporary originating telephone number. The device is configured to transmit the emergency call, with information identifying the temporary originating telephone number, to an emergency call device, the temporary originating telephone number permitting the emergency call device to place a return call to the user device.

20 Claims, 9 Drawing Sheets

US 8,903,051 B2

RETURNING CALLS TO EMERGENCY CALLERS WITHOUT VALID TELEPHONE NUMBERS

BACKGROUND

Emergency personnel (e.g., fire personnel, medical personnel, police, etc.) may receive an emergency call from a communication device, such as a landline telephone, a cellular telephone, or the like. The emergency call may include call information, such as a calling telephone number associated with the communication device. If the emergency call ends unexpectedly, emergency personnel may use the calling telephone number to place a call (e.g., a returning call) to the communication device.

DETAILED DESCRIPTION OF PREFERRED EMBODIMENTS

The following detailed description of example implementations refers to the accompanying drawings. The same reference numbers in different drawings may identify the same or similar elements.

An emergency call device (e.g., an emergency response call center, a device used by emergency response personnel, etc.) may receive an emergency call from a user device, such as a landline telephone, a cellular telephone, a computer device, or the like. After communicating with a user of the user device, emergency personnel associated with the emergency call device may wish to speak with the user after the emergency call has ended (e.g., to provide additional assistance, to obtain additional information, to reconnect during a dropped call, to reconnect after the call unexpectedly ends, etc.). The emergency call device may use a telephone number associated with the user device to reconnect.

Some user devices, however, may make emergency calls to the emergency call device, but may not be associated with valid telephone numbers. For example, a user device (e.g., a cellular telephone) without a service provider account (e.g., without a valid calling telephone number associated with the cellular telephone) may make emergency telephone calls (e.g., by dialing 911). In this instance, the emergency call device may not detect a valid telephone number associated with the user device, and may be unable to place a call to the user device after the emergency call has ended. Implementations described herein may allow an emergency call device to place a call to a user device without a valid telephone number.

Figure 1:
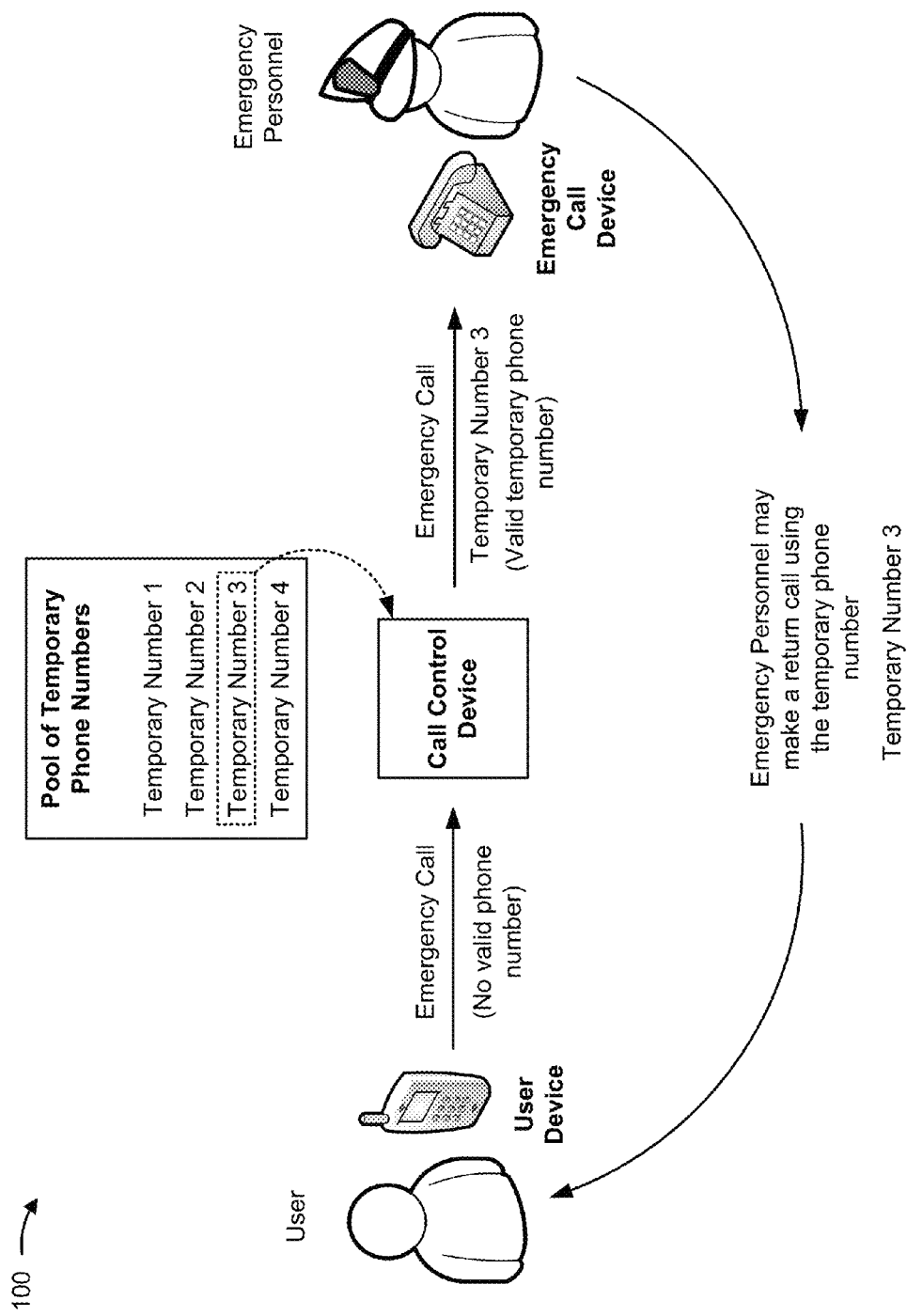
FIG. 1 is a diagram of an overview of an example implementation described herein.

FIG. 1 is a diagram of an overview of an example implementation 100 described herein. As shown in FIG. 1, example implementation 100 may include a user device, a call control device, a pool of temporary telephone numbers, and an emergency call device. Assume, for this overview, that the user device includes a cellular telephone, the call control device includes a telephone switch and/or a server, and the emergency call device includes a telephone at an emergency response dispatch center.

As shown in FIG. 1, a user may place an emergency call via the user device, such as a cellular telephone. The user device may not be associated with an active service provider account, and therefore, may not have a valid telephone number. The call control device may detect the emergency call, and may detect that the user device lacks a valid telephone number.

As further shown in FIG. 1, the call control device may receive a temporary telephone number (e.g., "Temporary Number 3"). The temporary telephone number may be received from a pool of temporary telephone numbers available for use during emergency calls. The call control device may associate the temporary telephone number with the user device (e.g., may store an association between the temporary telephone number and a device identifier that identifies the user device). The call control device may transmit the emergency call to an emergency call device associated with emergency personnel. The emergency call device may receive the emergency call, and may detect the temporary telephone number (e.g., "Temporary Number 3") associated with the user device.

As further shown in FIG. 1, after the emergency call has ended, emergency personnel may choose to contact the user (e.g., to obtain additional information, to further emergency response efforts, etc.). The emergency call device may use the temporary telephone number to place a returning call to the user device. The call control device may detect the returning call, and may transmit the returning call to the user device based on the association between the device identifier that identifies the user device and the temporary telephone number. In this way, a user device, without a valid telephone number, may be associated with a temporary valid telephone number during an emergency call, and emergency personnel may use the temporary valid telephone number to contact the user device after the emergency call has ended.

Figure 2:
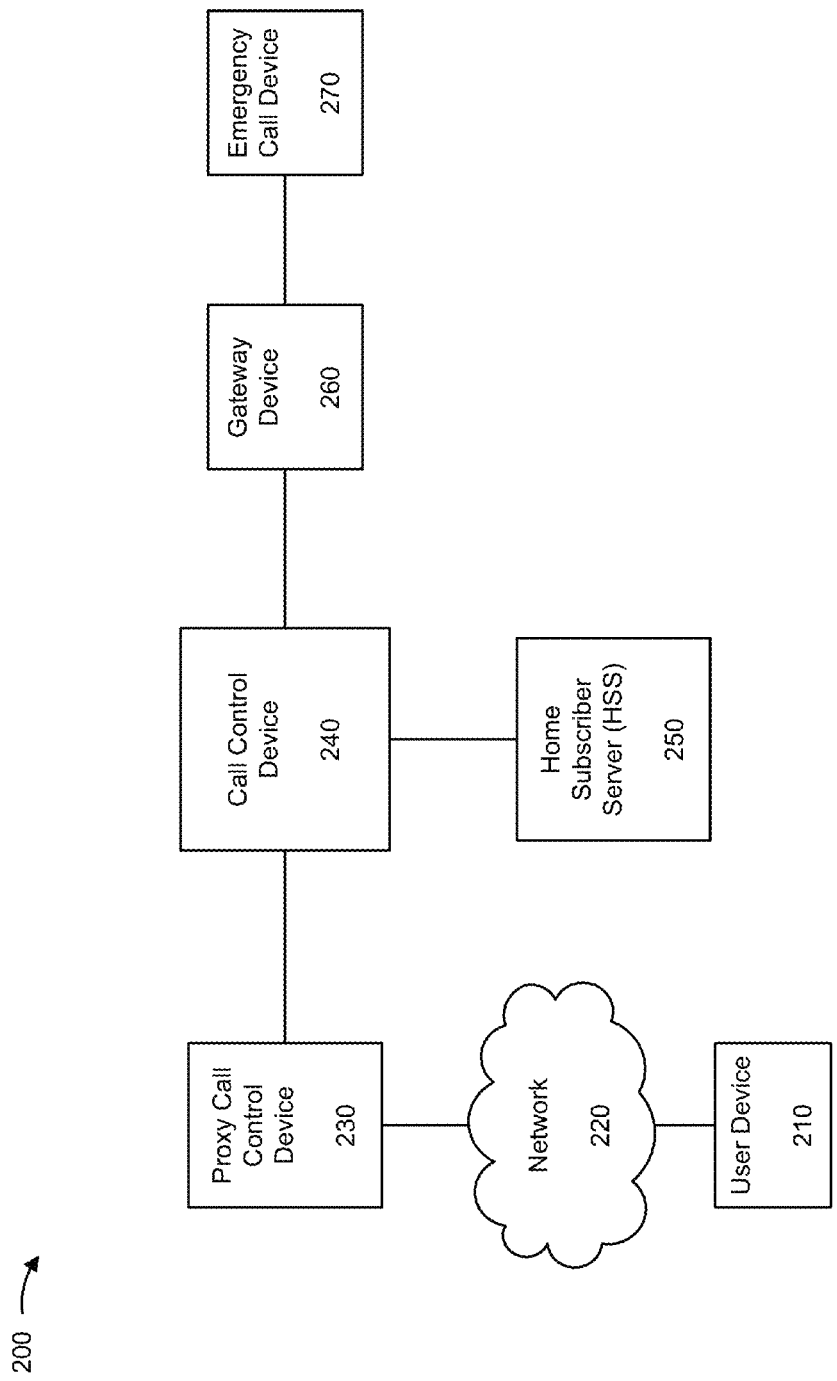
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a network 220, a proxy call control device 230, a call control device 240, a home subscriber server (HSS) 250, a gateway device 260, and an emergency call device 270. Devices of environment 200 may interconnect via wired connections, wireless connections, or a combination of wired and wireless connections.

User device 210 may include a device capable of making and/or receiving calls (e.g., voice and/or video calls). For example, user device 210 may include a landline telephone, a mobile telephone (e.g., a smart phone, a radiotelephone, etc.), a computing device (e.g., a desktop computer, a laptop computer, a tablet computer, a handheld computer, etc.), or a similar device. In some implementations, user device 210 may include a device without a valid telephone number, such as a device that is not associated with a service provider account. However, user device 210 may be capable of making and/or receiving emergency calls (e.g., to/from emergency call device 270).

Network 220 may include one or more wired and/or wireless networks. For example, network 220 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, and/or a combination of these or other types of networks.

Proxy call control device 230 may include one or more computation or communication devices, such as a server device. For example, proxy call control device 230 may include a device capable of receiving, processing, storing, and/or providing information, such as information associated with an emergency call. Proxy call control device 230 may include a device capable of processing and/or connecting calls from user device 210 and/or emergency call device 270.

Call control device 240 may include one or more computation or communication devices, such as a call session control function (CSCF) server or another type of server device, a gateway, a switch, or the like. For example, call control device 240 may include a device capable of receiving, processing, storing, and/or providing information, such as information associated with an emergency call, a device identifier associated with user device 210, a temporary telephone number, etc. Call control device 240 may include a device capable of processing and/or connecting calls between two or more devices, such as user device 210 and/or emergency call device 270.

HSS 250 may include one or more computation or communication devices, such as a server device. For example, HSS 250 may receive, store, and/or provide subscription-related information (e.g., subscriber profiles) associated with user device 210, and/or location-related information associated with user device 210 (e.g., user device 210 location, network address, etc.), and/or may perform authentication and authorization of user device 210. HSS 250 may monitor whether user device 210 has a valid telephone number, and may provide such information to proxy call control device 230, call control device 240, and/or gateway device 260. Additionally, or alternatively, HSS 250 may store a pool of temporary telephone numbers, and may provide a temporary telephone number to proxy call control device 230, call control device 240, and/or gateway device 260 to use in connection with user device 210.

Gateway device 260 may include one or more network devices, such as a gateway (e.g., a media gateway), a router, a modem, a switch, a firewall, a network interface card (NIC), a hub, a bridge, a proxy server, an optical add-drop multiplexer (OADM), or some other type of device that processes and/or transfers traffic. In some implementations, gateway device 260 may transmit information (e.g., information associated with a telephone call) between two or more different networks, including an internet protocol (IP) network, a PSTN, a public safety network including a public safety answering point (PSAP), or the like.

Emergency call device 270 may include a device capable of receiving and/or returning emergency calls. For example, emergency call device 270 may include a landline telephone, a mobile telephone (e.g., a smart phone, a radiotelephone, etc.), a computing device (e.g., a desktop computer, a laptop computer, a tablet computer, handheld computer, etc.), a collection of communication devices (e.g., a call center), a public safety answering point (PSAP), or a similar device.

The number of devices and networks shown in FIG. 2 is provided for explanatory purposes. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
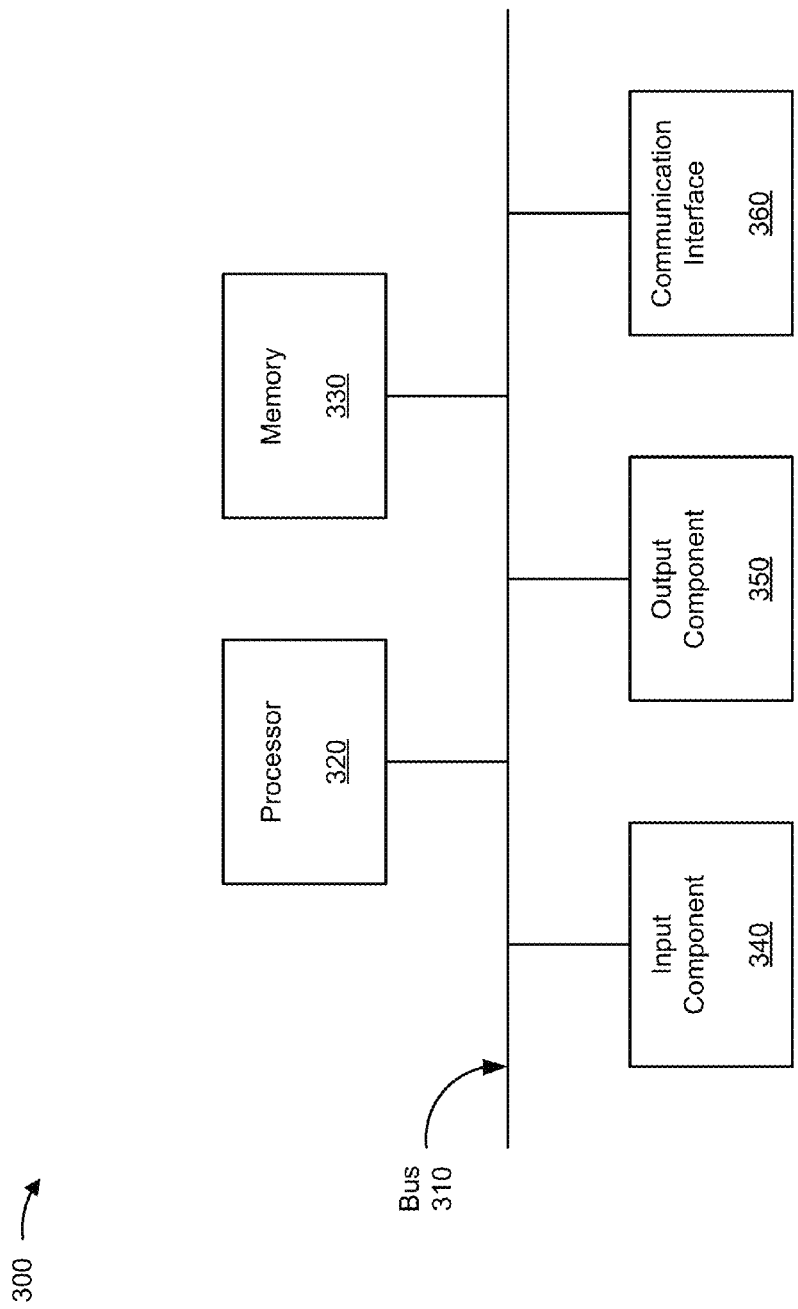
FIG. 3 is a diagram of example components of one or more devices of FIG. 2.

FIG. 3 is a diagram of example components of a device 300. Device 300 may correspond to user device 210, proxy call control device 230, call control device 240, HSS 250, gateway device 260, and/or emergency call device 270. Additionally, or alternatively, each of user device 210, proxy call control device 230, call control device 240, HSS 250, gateway device 260, and/or emergency call device 270 may include one or more devices 300 and/or one or more components of device 300. As illustrated in FIG. 3, device 300 may include a bus 310, a processor 320, a memory 330, an input component 340, an output component 350, and a communication interface 360.

Bus 310 may include a path that permits communication among the components of device 300. Processor 320 may include a processor (e.g., a central processing unit, a graphics processing unit, an accelerated processing unit), a microprocessor, and/or any processing logic (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g. a flash, magnetic, or optical memory) that stores information and/or instructions for use by processor 320.

Input component 340 may include a component that permits a user to input information to device 300 (e.g., a touch screen display, a keyboard, a keypad, a mouse, a button, a switch, etc.). Output component 350 may include a component that outputs information from device 300 (e.g., a display, a speaker, one or more light-emitting diodes (LEDs), etc.).

Communication interface 360 may include a transceiver-like component, such as a transceiver and/or a separate receiver and transmitter that enables device 300 to communicate with other devices, such as via a wired connection, a wireless connection, or a combination of wired and wireless connections. For example, a communication interface 360 may include an Ethernet interface, an optical interface, a coaxial interface, an infrared interface, a radio frequency (RF) interface, a universal serial bus (USB) interface, or the like.

Device 300 may perform various operations described herein. Device 300 may perform these operations in response to processor 320 executing software instructions included in a computer-readable medium, such as memory 330. A computer-readable medium may be defined as a non-transitory memory device. A memory device may include memory space within a single physical storage device or memory space spread across multiple physical storage devices.

Software instructions may be read into memory 330 from another computer-readable medium or from another device via communication interface 360. When executed, software instructions stored in memory 330 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number of components shown in FIG. 3 is provided for explanatory purposes. In practice, device 300 may include additional components, fewer components, different components, or differently arranged components than those shown in FIG. 3.

Figure 4A:
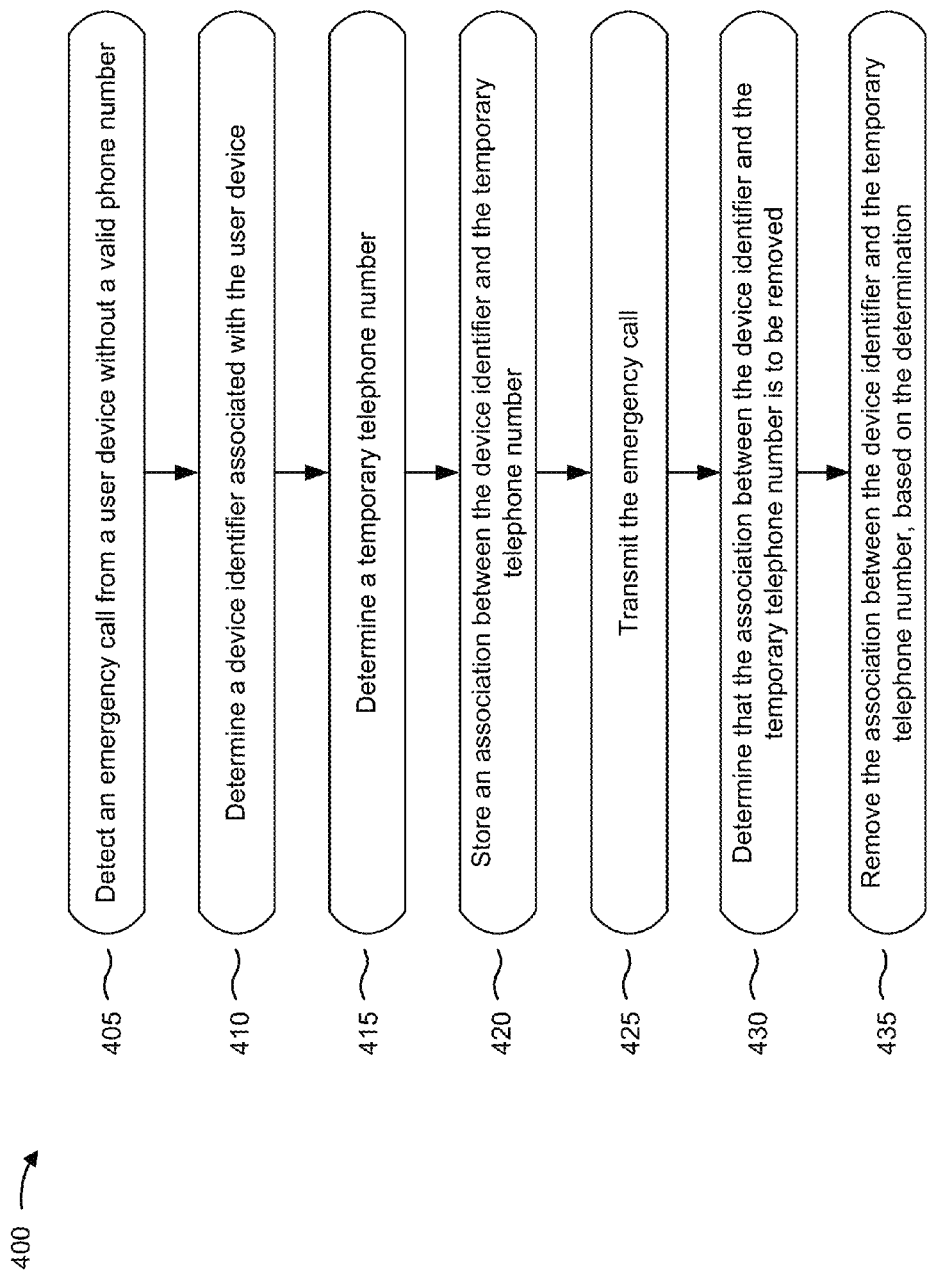
FIGS. 4A and 4B are flow charts of an example process for associating a temporary telephone number with a user device making an emergency call.
Figure 4B:
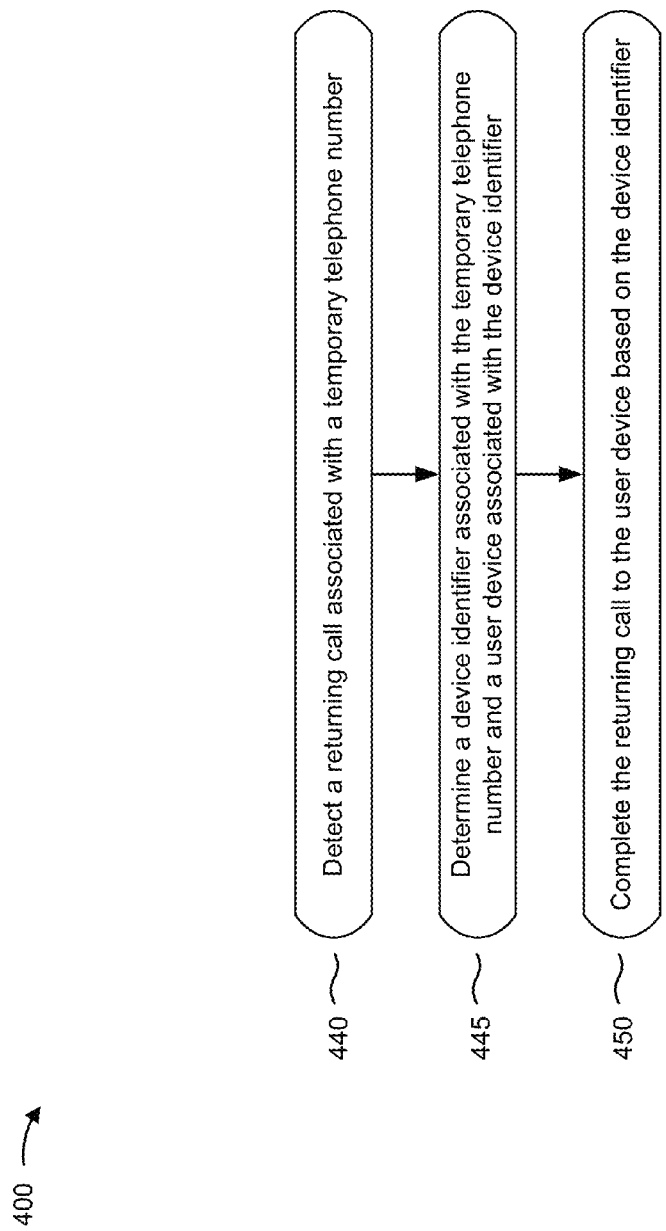

FIGS. 4A and 4B are flow charts of an example process 400 for associating a temporary telephone number with a user device making an emergency call. In some implementations, one or more process blocks of FIGS. 4A and 4B may be performed by call control device 240. Additionally, or alternatively, one or more process blocks of FIG. 4 may be performed by another device or group of devices separate from or including call control device 240, such as proxy call control device 230, HSS 250, and/or gateway device 260.

As shown in FIG. 4A, process 400 may include detecting an emergency call from a user device without a valid telephone number (block 405). For example, call control device 240 may detect that user device 210 does not have a valid telephone number, and may detect that user device 210 is attempting to make an emergency call.

In some implementations, the emergency call may include a call placed to emergency services. For example, an emergency call may include a call placed to emergency police services, emergency fire services, emergency medical services, or the like. In some implementations, the emergency call may be made by dialing an emergency number (e.g., "911" in the United States, "112" in parts of Europe, etc.). Additionally, or alternatively, the emergency call may be placed by contacting an operator (e.g., an operator of a communication network) and requesting to be connected to emergency services. In some implementations, the emergency call may include a call over the Internet using voice over internet protocol (VoIP). Additionally, or alternatively, the emergency call may include a video call, an instant message (IM) exchange, a short message service (SMS) exchange, and/or any other type of real-time communication.

In some implementations, call control device 240 may determine that user device 210 is not associated with an originating telephone number and/or a valid subscription (e.g., without an activated service provider account associated with user device 210). For example, user device 210 may include a device that has not been initialized (e.g., has not had a service provider account activated). Additionally, or alternatively, user device 210 may include a device that has been deactivated (e.g., has had a service provider account deactivated due to an unpaid bill, an expiration of time, an end of a service contract, or the like). Call control device 240 may determine that user device 210 is not associated with an originating telephone number and/or a valid subscription by detecting that user device 210 is not associated with a user profile (e.g., a user profile stored by HSS 250). However, a service provider may permit user device 210 to place emergency calls despite not having a valid telephone number and/or subscription.

In some implementations, call control device 240 may determine that user device 210 is not associated with an originating telephone number and/or a valid subscription by use of session initial protocol (SIP). SIP may be used to create, modify, and/or terminate two party and/or multiparty communication sessions (e.g., telephone calls, videoconferencing, multimedia streaming, instant messaging, etc.) over a network. For example, call control device 240 may receive a SIP request (e.g., a SIP invite) to initiate a communication session, and may determine from the SIP request that user device 210 is not associated with an originating telephone number.

As further shown in FIG. 4A, process 400 may include determining a device identifier associated with the user device (block 410). For example, call control device 240 may determine a device identifier associated with user device 210. The device identifier may include a set of characters (e.g., numbers, letters, symbols, etc.) that uniquely identifies a device connected to a network (e.g., a communication network, network 220, etc.).

In some implementations, the device identifier may include an internet protocol address (IP address). The IP address may include a unique numerical label assigned to a device (e.g., a computing device, a cellular telephone, a smart phone, etc.) connected to a network that uses IP for communication. In some implementations, the IP address may include one or more binary numbers. Additionally, or alternatively, the IP address may include one or more numbers displayed in human-readable notation (e.g., as text). In some implementations, the IP address may include a number that is a set quantity of bits (e.g., a quantity with two possible values, such as "1" or "0") in length (e.g., a 32-bit number, a 128-bit number, etc.). For example, the IP address may include a 32-bit number associated with internet protocol version 4 (IPv4), a 128-bit number associated with internet protocol version 6 (IPv6), etc.

In some implementations, the device identifier may include an identifier associated with user device 210, such as a user name, a user account number, etc. Additionally, or alternatively, the device identifier may include a device serial number, a mobile equipment identifier (MEID), a mobile dialing/directory number (MDN), an international mobile subscriber identity (IMSI), a mobile station international subscriber directory number (MSISDN), a service programming code (SPC), or the like.

As further shown in FIG. 4A, process 400 may include determining a temporary telephone number (block 415). For example, call control device 240 may determine a temporary telephone number to associate with user device 210. In some implementations, call control device 240 may generate the temporary telephone number. For example, call control device 240 may detect that user device 210 is making an emergency call, and that user device 210 does not have a valid telephone number. Call control device 240 may generate a temporary telephone number for use by user device 210 during the emergency call.

In some implementations, call control device 240 may receive the temporary telephone number from another device, such as HSS 250. HSS 250 may store information that identifies a particular call control device 240 (e.g., from among the call control devices 240 associated with network 220) that received the temporary telephone number. In some implementations, HSS 250 may maintain a pool of temporary telephone numbers. The pool of temporary telephone numbers may include one or more valid telephone numbers for use in making emergency calls. When the user device 210 attempts to make an emergency call without a valid telephone number, call control device 240 may request a temporary telephone number from HSS 250. HSS 250 may select, from the pool of temporary telephone numbers, a temporary telephone number to be used by user device 210. Call control device 240 may receive the temporary telephone number from HSS 250, and may associate the temporary telephone number with user device 210 (e.g., by storing an association between the temporary telephone number and a device identifier).

In some implementations, call control device 240 may select the temporary telephone number from the pool of temporary telephone numbers based on a characteristic of the temporary telephone number and/or user device 210. For example, call control device 240 may select, from the pool of temporary telephone numbers, the temporary telephone number that has not been used (e.g., has not been associated with a user device 210 making an emergency call) for the longest amount of time. Additionally, or alternatively, call control device 240 may select a temporary telephone number with an area code that matches an area code associated with a location of user device 210.

In some implementations, HSS 250 may store a user profile associated with user device 210. Additionally, or alternatively, HSS 250 may generate a temporary user profile associated with user device 210. In some implementations, the user profile may include information about user device 210, such as an indication that user device 210 is not associated with a valid telephone number, a device location, a time associated with the emergency call, a date associated with the emergency call, a duration associated with the emergency call, a name of a user associated with user device 210, etc.

As further shown in FIG. 4A, process 400 may include storing an association between the device identifier and the temporary telephone number (block 420). For example, call control device 240 may store an association between the device identifier, that identifies user device 210, and the temporary telephone number.

In some implementations, the temporary telephone number may include a telephone number selected from a pool of temporary telephone numbers, and received from HSS 250. The device identifier may include an IP address associated with user device 210. In this instance, call control device 240 may store the association between the temporary telephone number and the IP address. For example, call control device 240 may store the association in a data structure.

As further shown in FIG. 4A, process 400 may include transmitting the emergency call (block 425). For example, call control device 240 may transmit the emergency call to gateway device 260 and/or emergency call device 270.

In some implementations, call control device 240 may transmit the emergency call based on call information. Call information may include information about the call, such as information that identifies a device type associated with user device 210, a device location associated with user device 210, a time associated with the emergency call, a date associated with the emergency call, or the like. For example, call control device 240 may transmit the emergency call based on a location of user device 210. In this instance, call control device 240 may determine the location of user device 210 and may transmit the emergency call to a particular emergency call device 270 associated with the location. For example, call control device 240 may transmit an emergency call placed from user device 210 in a particular location (e.g., Atlanta, Ga.) to an emergency call device located in that area (e.g., a police station in Atlanta, a fire department in Atlanta, a hospital in Atlanta, etc.).

In some implementations, call control device 240 may transmit the emergency call by use of an emergency routing service (ERS). The ERS may include a device and/or a system of devices capable of identifying a particular emergency call device 270 in a location associated with a user device 210 placing the emergency call. For example, call control device 240 may receive call information that identifies the location of user device 210. Based on the location, call control device 240 may use the ERS to determine a particular emergency call device 270 associated with the location. Based on the determination, call control device 240 may transmit the emergency call to the particular emergency call device 270. In some implementations, call control device 240 may transmit the emergency call by use of a routing key, such as an emergency server routing key (ESRK), an emergency service querying key (ESQK), or the like.

In some implementations, call control device 240 may transmit call information in addition to transmitting the emergency call. For example, call control device 240 may transmit information identifying the device location (e.g., the location of user device 210) to emergency call device 270.

In some implementations, the emergency call may be transmitted via gateway device 260. Gateway device 260 may transfer the emergency call from one network to another. For example, gateway device 260 may transfer the emergency call from an IP network (e.g., the Internet, a 4G network, etc.) to a publicly switched telephone network (PSTN). Additionally, or alternatively, gateway device 260 may convert the emergency call to a signal capable of being received by a PSAP, such as emergency call device 270.

As further shown in FIG. 4A, process 400 may include determining that the association between the device identifier and the temporary telephone number is to be removed (block 430). For example, call control device 240 may detect that the association between the device identifier, associated with user device 210, and the temporary telephone number is to be removed.

In some implementations, call control device 240 may remove the association between the device identifier and the temporary telephone number based on detecting a lapse of time. For example, call control device 240 may detect a passage of an amount of time from the time that the emergency call was transmitted, disconnected, etc. The lapse in time may be measured from a start and/or an end of the emergency call. Additionally, or alternatively, the lapse in time may be measured from another event, such as from an arrival of emergency personnel on a scene of an emergency, and/or a departure of emergency personnel from the scene of the emergency (which may be indicated, for example, by information received from emergency call device 270).

In some implementations, call control device 240 may use a timer to measure the lapse in time. For example, call control device 240 may start the timer at the start and/or the end of the emergency call. When the timer reaches a predetermined value (e.g., three hours), call control device 240 may remove the association between the device identifier and the temporary telephone number. In some implementations, the predetermined value may be updated at the completion of the emergency call. For example, the timer may be started at the start of the emergency call, and the value may be updated (e.g., with a shorter value) when the emergency call has ended.

In some implementations, call control device 240 may remove the association between the device identifier and the temporary telephone number based on information received from a device, such as user device 210, proxy call control device 230, HSS 250, gateway device 260, and/or emergency call device 270. For example, a user (e.g., a user of user device 210, a user of emergency call device 270, etc.) may provide user input, which may be transmitted to call control device 240. The user input may indicate that the association between the device identifier and the temporary telephone number is to be removed.

As further shown in FIG. 4A, process 400 may include removing the association between the device identifier and the temporary telephone number, based on determining that the association between the device identifier and the temporary telephone number is to be removed (block 435). For example, call control device 240 may determine that the association between the device identifier and the temporary telephone number is to be removed, and may remove the association between the device identifier and the temporary telephone number, based on the determination. In some implementations, removing the association may include deleting the device identifier and/or the temporary telephone number from a data structure (e.g., a data structure stored by call control device 240).

In some implementations, call control device 240 may determine that the association between the device identifier and the temporary telephone number is to be removed (e.g., detect a lapse in time), and may remove the association between the device identifier (e.g., an IP address) and the temporary telephone number. For example, call control device 240 may receive an emergency call from user device 210. Call control device 240 may determine a particular IP address associated with user device 210, may store an association between the IP address and a temporary telephone number, and may transmit the emergency call to emergency call device 270. After the emergency call has ended, emergency call device 270 may be use the temporary telephone number to contact (e.g., via a telephone call) user device 210. Call control device 240 may detect that a particular amount of time has passed from the end of the emergency call. Based on detecting the lapse of time, call control device 240 may remove the association between the IP address and the temporary telephone number. After removing the association, emergency call device 270 may not be able to use the temporary telephone number to contact user device 210.

In some implementations, after call control device 240 has removed the association between the device identifier and the temporary telephone number, the temporary telephone number may be made available for future emergency calls (e.g., may be associated with another user device 210 at a later time). For example, the temporary telephone number may be stored in a pool (e.g., a collection, a data structure, etc.) of temporary telephone numbers. After being associated with the device identifier identifying user device 210, call control device 240 may remove the association between the device identifier and the temporary telephone number, and may return the temporary telephone number to the pool of temporary telephone numbers. In some implementations, the pool of temporary telephone numbers may be stored by HSS 250, and call control device 240 may provide an indication, to HSS 250, that the association is to be removed.

In some implementations, HSS 250 may store the pool of temporary telephone numbers in a data structure. For example, the data structure may store an indication of which temporary telephone numbers are available to assign during emergency calls, and/or which temporary telephone numbers are currently assigned (e.g., associated with a device identifier) to a user device 210. In some implementations, HSS 250 may receive an indication, from call control device 240, that the association between the device identifier and the temporary telephone number is to be removed, and may change the stored indication in the data structure accordingly.

In some implementations, HSS 250 may store the temporary telephone number in a queue. For example, when determining the temporary telephone number, HSS 250 may select the temporary telephone number that is first in the queue. When the association between the device identifier and the temporary telephone number is removed, HSS 250 may store the removed temporary telephone number last in the queue. Additionally, or alternatively, HSS 250 may store information about the temporary telephone number, such as information identifying when the temporary telephone number was last used (e.g., associated with a device identifier during an emergency call), information identifying a historical record of previous device identifiers previously associated with the temporary telephone number, etc.

In some implementations, a user (e.g., a user of user device 210, emergency personnel associated with emergency call device 270, etc.) may determine when call control device 240 is to remove the association between the device identifier and the temporary telephone number. For example, a user of user device 210 may place an emergency call to emergency call device 270. After completing the emergency call, the user may provide input (e.g., input to user device 210) indicating that the device identifier is no longer to be associated with the temporary telephone number. Call control device 240 may receive the user input (e.g., from user device 210) and may remove the association between the device identifier and the temporary telephone number based on the user input.

In some implementations, emergency personnel associated with emergency call device 270 may determine when call control device 240 is to remove the association between the device identifier and the temporary telephone number. For example, emergency call device 270 may receive an emergency call from user device 210. Emergency personnel associated with emergency call device 270 may use the temporary telephone number (e.g., the temporary telephone number associated with the device identifier that identifies user device 210) to connect to user device 210. Emergency personnel may provide user input (e.g., after responding to the emergency call, after determining that the emergency has ended, after creating a report about the emergency call, etc.) indicating that the association between the device identifier and the temporary telephone number is to be removed. Call control device 240 may receive the user input (e.g., from emergency call device 270) and may remove the association between the device identifier and the temporary telephone number based on the user input.

As shown in FIG. 4B, process 400 may include detecting a returning call associated with a temporary telephone number (block 440). For example, call control device 240 may detect a returning call placed by emergency call device 270. The returning call may be associated with the temporary telephone number and/or may be destined for user device 210 with a device identifier associated with the temporary telephone number.

In some implementations, emergency personnel associated with emergency call device 270 may place a returning call to user device 210 after receiving an emergency call from user device 210. Emergency call device 270 may place the returning call using the temporary telephone number (e.g., the temporary telephone number associated with a device identifier identifying user device 210). In some implementations, emergency call device 270 may automatically return an interrupted call (e.g., a dropped call).

In some implementations, the returning call may be transferred by gateway device 260. For example, gateway device 260 may transfer the returning call from a PSTN (e.g., a PSTN associated with a PSAP) to an IP network. Gateway device 260 may transmit and/or route the returning call to call control device 240.

As further shown in FIG. 4B, process 400 may include determining a device identifier associated with the temporary telephone number and a user device associated with the device identifier (block 445). For example, call control device 240 may determine a device identifier associated with the temporary telephone number, and may determine that the device identifier is associated with user device 210.

In some implementations, call control device 240 may use the stored association between the device identifier and the temporary telephone number to determine the device identifier associated with the temporary telephone number. For example, emergency call device 270 may place a call to user device 210 using the temporary telephone number. Call control device 240 may use the temporary telephone number to determine the device identifier stored by call control device 240. Additionally, or alternatively, the association between the device identifier and the temporary telephone number may be stored by another device, such as HSS 250 and/or proxy call control device 230. In this instance, call control device 240 may request and receive, from HSS 250 and/or proxy call control device 230, information that identifies the device identifier associated with the temporary telephone number.

In some implementations, call control device 240 may determine that the temporary telephone number is associated with a particular IP address. For example, the particular IP address may identify, on an IP network (e.g., network 220), user device 210.

As further shown in FIG. 4B, process 400 may include completing the returning call to the user device based on the device identifier (block 450). For example, call control device 240 may complete the returning call to user device 210 based on the device identifier identifying user device 210.

In some implementations, the returning call may be completed by a series of devices. For example, emergency call device 270 may place the returning call using the temporary telephone number. Gateway device 260 may use the temporary telephone number to transmit the returning call to call control device 240. Call control device 240 may use the temporary telephone number (e.g., may use the stored association between the device identifier and the temporary telephone number) to determine the device identifier. Call control device 240 may transmit the returning call to proxy call control device 230 based on the device identifier. Proxy call control device 230 may use the device identifier to identify user device 210, and may transmit the returning call to user device 210. Additionally, or alternatively, call control device 240 may receive the returning call from emergency call device 270, may determine the device identifier, may use the device identifier to identify user device 210, and may transmit the returning call to user device 210 based on the device identifier. In this way, any or all of proxy call control device 230, call control device 240, and/or gateway device 260 may transmit and/or route calls between user device 210 and emergency call device 270.

In some implementations, gateway device 260 may receive the returning call from emergency call device 270, and may send a query to HSS 250. The query may include the temporary telephone number, and HSS 250 may use the temporary telephone number to determine the particular call control device 240 that received the emergency call from user device 210. Gateway device 260 may receive, from HSS 250, an indication identifying the particular call control device 240, and may transmit the returning call to the particular call control device 240. Call control device 240 may complete the returning call based on the association between the temporary telephone number and the device identifier.

While a series of blocks has been described with regard to FIGS. 4A and 4B, the blocks and/or the order of the blocks may be modified in some implementations. Additionally, or alternatively, non-dependent blocks may be performed in parallel.

Figure 5A:
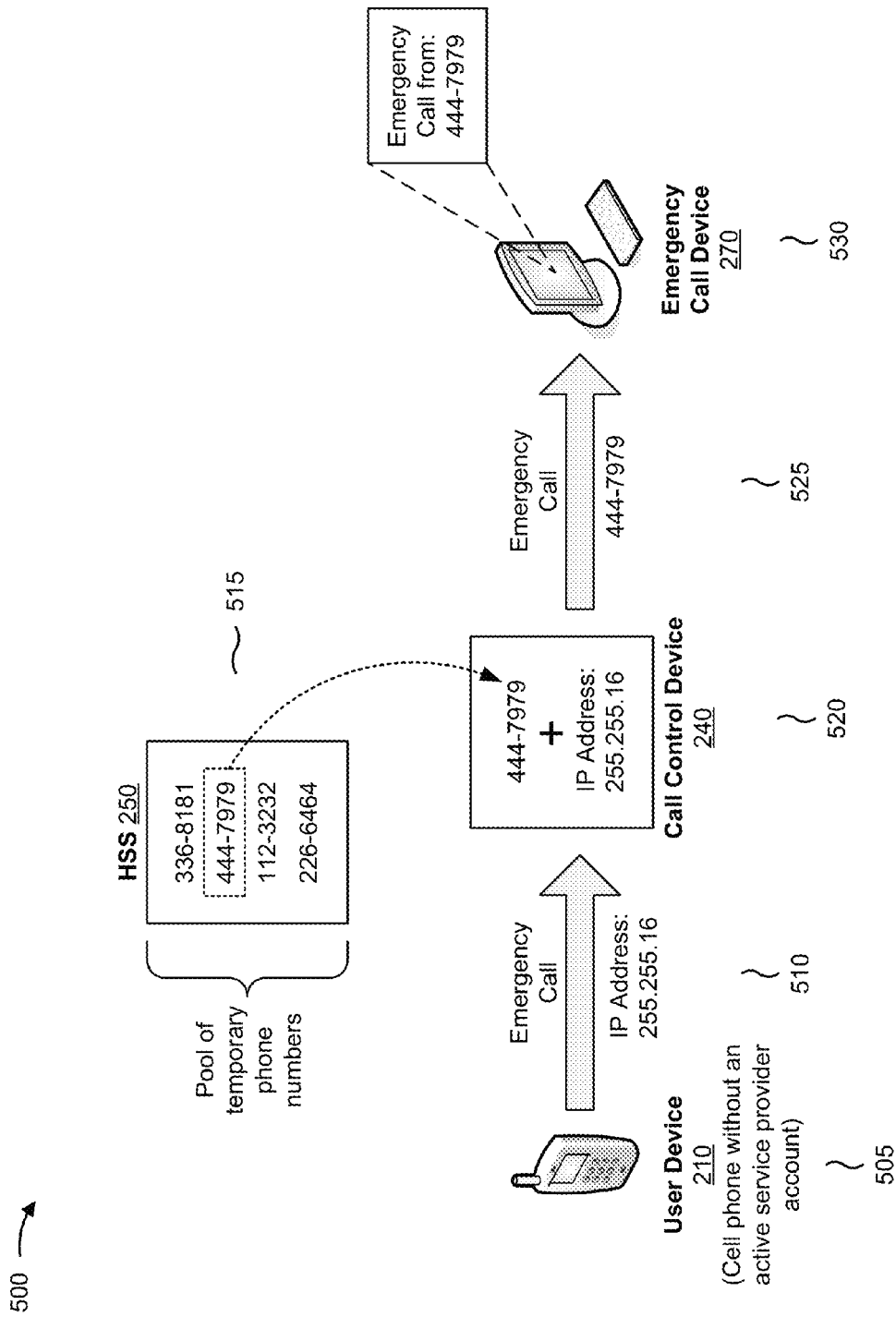
FIGS. 5A-5C are diagrams of an example implementation relating to the example process shown in FIG. 4.
Figure 5B:
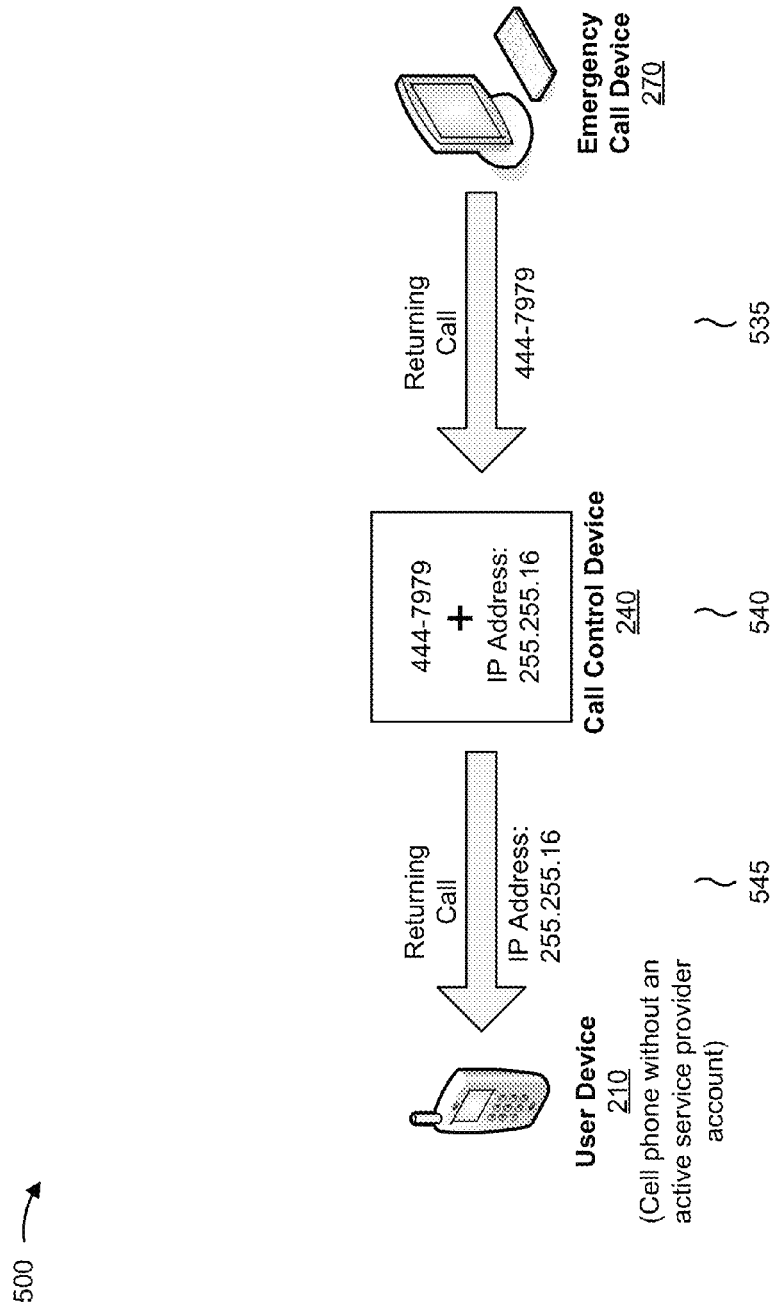
Figure 5C:
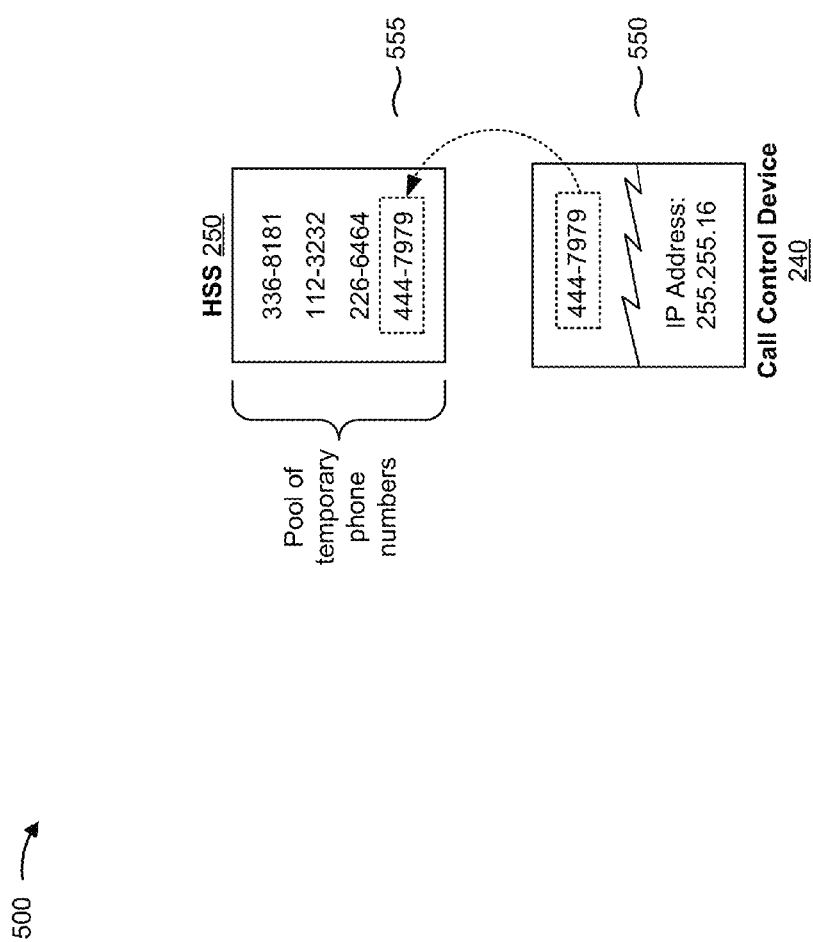

FIGS. 5A-5C are diagrams of an example implementation 500 relating to process 400 (FIGS. 4A and 4B). In example implementation 500, user device 210 may place an emergency call to emergency call device 270, call control device 240 may associate a temporary telephone number with the emergency call, and emergency call device 270 may use the temporary telephone number to make a returning call to user device 210.

FIG. 5A is a diagram of an example implementation where call control device 240 completes an emergency call from user device 210 to emergency call device 270.

As shown by reference number 505, user device 210 may include a cellular telephone without an active service provider account. User device 210 may place an emergency call (e.g., by dialing 911). Because user device 210 is not associated with an active service provider account, user device 210 may not be associated with a valid telephone number. User device 210 may be associated with a device identifier, as shown by reference number 510. The device identifier may correspond to an IP address (e.g., "IP Address: 255.255.16") that identifies user device 210. The emergency call may be placed using the device identifier.

Call control device 240 may detect that user device 210 is making an emergency call. Call control device 240 may further detect that user device 210 is not associated with a valid telephone number. As shown by reference number 515, call control device 240 may request and/or receive a temporary telephone number (e.g., "444-7979") from HSS 250. HSS 250 may store a quantity of temporary telephone numbers (e.g., "336-8181," "444-7979," "112-3232," and "226-6464") in a pool of temporary telephone numbers. HSS 250 may select the temporary telephone number (e.g., "444-7979") from among the pool of temporary telephone numbers, and call control device 240 may receive the selected temporary telephone number from HSS 250.

As shown by reference number 520, call control device 240 may store an association between the device identifier (e.g., "IP Address: 255.255.16") and the temporary telephone number (e.g., "444-7979"). As shown by reference number 525, call control device 240 may complete the emergency call using the temporary telephone number (e.g., "444-7979"). Emergency call device 270 may receive the emergency call, as shown by reference number 530. In some implementations, emergency call device 270 may display the temporary telephone number on a display associated with emergency call device 270 (e.g., "Emergency Call from: 444-7979"). In this manner, emergency call device 270 may receive an emergency call from a user device 210 without a valid telephone number.

FIG. 5B is a diagram of an example implementation where emergency call device 270 places a returning call to user device 210 using the temporary telephone number.

As shown by reference number 535, emergency call device 270 may place a returning call to user device 210. The returning call may be placed after emergency call device 270 has received the emergency call from user device 210. For example, emergency personnel associated with emergency call device 270 may decide to speak with a user of user device 210 (e.g., due to the emergency call being disconnected, a desire to obtain additional information from the user, etc.) after the emergency call has ended. Emergency call device 270 may place the returning call using the temporary telephone number (e.g., by dialing "444-7979").

As shown by reference number 540, call control device 240 may receive the returning call. Call control device 240 may use the temporary telephone number identified by the returning call to determine a device identifier associated with the temporary telephone number. For example, call control device 240 may detect the temporary telephone number (e.g., "444-7979"), and may use the association between the temporary telephone number and the device identifier (e.g., "IP Address: "255.255.16") stored by call control device 240 to determine the device identifier (e.g., "IP Address: 255.255.16"). The device identifier may identify user device

210. Thus, call control device 240 may determine that the returning call is directed to user device 210.

As shown by reference number 545, call control device 240 may transmit the returning call to user device 210. Call control device 240 may use the device identifier (e.g., "IP Address: 255.255.16") to identify and/or transmit the returning call to user device 210. In this manner, emergency call device 270 may be connected to user device 210 after user device 210 has been disconnected from an emergency call with emergency call device 270.

FIG. 5C is a diagram of an example implementation where call control device 240 removes the association between the device identifier and the temporary telephone number.

As shown by reference number 550, call control device 240 may determine that the association between the device identifier and the temporary telephone number is to be removed. For example, call control device 240 may detect that a particular amount of time has elapsed since the end of the emergency call and/or the returning call. Based on determining that the association between the device identifier and the temporary telephone number is to be removed, call control device 240 may remove the association between the device identifier (e.g., "255.255.16") and the temporary telephone number (e.g., "444-7979").

As shown by reference number 555, the temporary telephone number (e.g., "444-7979") may be placed into a pool of temporary telephone numbers. For example, HSS 250 may store a pool of temporary telephone numbers. Call control device 240 may send a notification to HSS 250 indicating that the temporary telephone number (e.g., "444-7979") may be available for use during future emergency calls.

Figure 6:
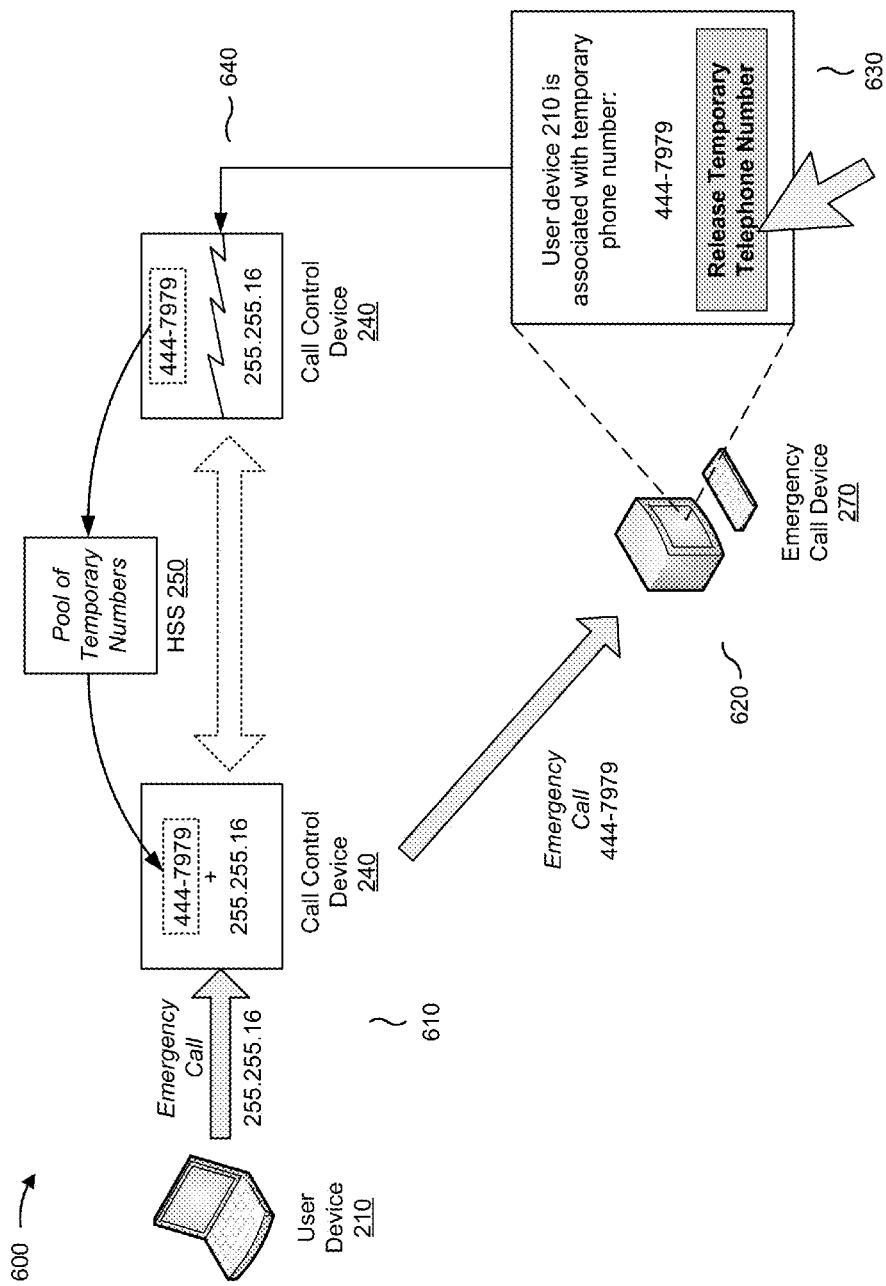
FIG. 6 is a diagram of another example implementation relating to the example process shown in FIG. 4.

FIG. 6 is a diagram of an example implementation 600 relating to process 400 shown in FIGS. 4A and 4B. In example implementation 600, call control device 240 may remove the association between a device identifier identifying user device 210 and a temporary telephone number, based on input provided by emergency personnel associated with emergency call device 270.

As shown by reference number 610, user device 210 may include a laptop computer. User device 210 may place an emergency call over the Internet (e.g., a VoIP call). User device 210 may be associated with an IP address (e.g., "255.255.16"), but not a valid telephone number. Call control device 240 may detect that user device 210 is not associated with a valid telephone number, and may receive a temporary telephone number (e.g., "444-7979") from HSS 250. Call control device 240 may use the IP address (e.g., "255.255.16") as a device identifier that identifies user device 210. Call control device 240 may store the association between the device identifier (e.g., "255.255.16") and the temporary telephone number (e.g., "444-7979").

As shown by reference number 620, call control device 240 may transmit the emergency call to emergency call device 270. The call may be transmitted with the temporary telephone number (e.g., "444-7979"). In some implementations, emergency call device 270 may display the temporary telephone number to emergency personnel associated with emergency call device 270. Emergency personnel may communicate with a user of user device 210 during the emergency call. In some implementations, after the emergency call has ended, the emergency personnel may use emergency call device 270 to place a returning call to user device 210 using the temporary telephone number. Call control device 240 may use the temporary telephone number (e.g., "444-7979"), and the association between the temporary telephone number and the device identifier (e.g., "255.255.16"), to transmit the returning call to user device 210.

As shown by reference number 630, emergency call device 270 may display information that allows emergency personnel to remove the association between the device identifier (e.g., "255.255.26") and the temporary telephone number (e.g., "444-7979"). The information may display the association between user device 210 and the temporary telephone number (e.g., "User device 210 is associated with the temporary telephone number: 444-7979") on a user interface associated with emergency call device 270. The user interface may provide an option (e.g., a button, an icon, etc.) to remove the association (e.g., "Release Temporary Telephone Number"). Emergency personnel may determine that there is not a need to contact user device 210 (e.g., an emergency may have ended, emergency personnel may have responded to a scene of the emergency, etc.). Emergency personnel may provide input (e.g., by selecting "Release Temporary Telephone Number") to emergency call device 270, indicating that the association between the device identifier and the temporary telephone number is to be removed.

As shown by reference number 640, call control device 240 may receive the information input by emergency personnel (e.g., may determine that the association between the device identifier and the temporary telephone number is to be removed) from emergency call device 270. Based on receiving the information, call control device 240 may remove the association between the device identifier (e.g., "255.255.16") and the temporary telephone number (e.g., "444-7979"). Call control device 240 may send a notification to HSS 250 indicating that the temporary telephone number is to be made available for future use for emergency calls (e.g., placed back into the pool of temporary telephone numbers).

Implementations described herein may allow a user device, without a valid telephone number, to be associated with a temporary valid telephone number during an emergency call, and may allow emergency personnel to use the temporary valid telephone number to contact the user device after the emergency call has ended.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term "component" is intended to be broadly construed as hardware, firmware, or a combination of hardware and software.

Certain user interfaces have been described herein. In some implementations, the user interfaces may be customizable by a device. Additionally, or alternatively, the user interfaces may be pre-configured to a standard configuration, a specific configuration based on capabilities and/or specifications associated with a device on which the user interfaces are displayed, or a set of configurations based on capabilities and/or specifications associated with a device on which the user interfaces are displayed.

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more times, and may be used interchangeably with "one or more." Where only one item is intended, the term "one" or similar language is used. Further, the phrase "based on" is intended to mean "based, at least in part, on" unless explicitly stated otherwise.

What is claimed is:

1. A device, comprising:
   one or more processors to:
      detect an emergency call from a user device associated with a device identifier,
         the device identifier including information that identifies the user device;
      determine that the user device is not associated with a user profile stored by a home subscriber server;
      determine that the user device is not associated with a valid originating telephone number based on the user device not being associated with the user profile;
      determine a temporary originating telephone number, based on determining that the user device is not associated with the valid originating telephone number;
      store an association between the device identifier and the temporary originating telephone number; and
      transmit the emergency call, with information identifying the temporary originating telephone number, to an emergency call device,
         the temporary originating telephone number permitting the emergency call device to place a return call to the user device.

2. The device of claim 1, where the one or more processors, when determining that the user device is not associated with the valid originating telephone number, are further to:
   detect that a service provider account associated with the user device is not activated, and
   determine that the user device is not associated with the valid originating telephone number based on the service provider account not being activated.

3. The device of claim 1, where the one or more processors are further to:
   determine that the association is to be removed; and
   remove the association based on determining that the association is to be removed.

4. The device of claim 3, where the one or more processors, when determining that the association is to be removed, are further to:
   determine that the association is to be removed based on at least one of:
      a lapse in time after the emergency call is transmitted;
      a lapse in time after the emergency call ends;
      input received from the user device; or
      input received from the emergency call device.

5. The device of claim 1, where the one or more processors, when determining the temporary originating telephone number, are further to:
   receive information identifying the temporary originating telephone number from an external device; and
   where the one or more processors are further to:
      determine that the association is to be removed; and
      notify the external device that the association is to be removed based on determining that the association is to be removed.

6. The device of claim 1, where the one or more processors, when detecting the emergency call from the user device, are further to:
   detect emergency call information including at least one of:
      information that identifies a device type associated with the user device;
      information that identifies a location associated with the user device;
      information that identifies a user associated with the user device;
      information that identifies a time associated with the emergency call; or
      information that identifies a date associated with the emergency call; and
   where the one or more processors, when transmitting the emergency call, are further to:
      transmit the emergency call based on the emergency call information.

7. The device of claim 1, where the one or more processors are further to:
   detect the return call from the emergency call device,
      the return call being directed to the temporary originating telephone number;
   determine the device identifier associated with the temporary originating telephone number; and
   transmit the return call to the user device based on the device identifier.

8. A computer-readable medium storing instructions, the instructions comprising:
   one or more instructions that, when executed by a processor of a device, cause the processor to:
      detect an emergency call from a user device associated with a device identifier,
         the device identifier including information that identifies the user device;
      determine that the user device is not associated with a user profile stored by a home subscriber server;
      determine that the user device is not associated with a valid originating telephone number based on the user device not being associated with the user profile;
      determine a temporary originating telephone number for the user device based on detecting that the user device is not associated with a valid originating telephone number;
      store an association between the device identifier and the temporary originating telephone number;
      transmit the emergency call, with information identifying the temporary originating telephone number, to an emergency call device;
      detect a returning call from the emergency call device that receives the emergency call,
         the returning call being directed to the temporary originating telephone number;
      determine the device identifier associated with the temporary originating telephone number; and
      transmit the returning call to the user device based on the device identifier.

9. The computer-readable medium of claim 8, where the one or more instructions to determine that the user device is not associated with the valid originating telephone number further include:
   one or more instructions that, when executed by the processor, cause the processor to:

detect that a service provider account associated with the user device is not activated, and
determine that the user device is not associated with the valid originating telephone number based on the service provider account not being activated.

10. The computer-readable medium of claim 8, where the device identifier includes at least one of:
an internet protocol (IP) address associated with the user device;
a device serial number;
an international mobile subscriber identity (IMSI);
a mobile station international subscriber directory number (MSISDN);
a mobile equipment identifier (MEID);
a mobile dialing number (MDN); or
a service programming code (SPC).

11. The computer-readable medium of claim 8, where the instructions further comprise:
one or more instructions that, when executed by the processor, cause the processor to:
determine that the association, between the device identifier and the temporary telephone number, is to be removed; and
remove the association between the device identifier and the temporary originating telephone number based on determining that the association is to be removed.

12. The computer-readable medium of claim 11, where the one or more instructions to determine that the association is to be removed include:
one or more instructions that, when executed by the processor, cause the processor to:
determine that the association is to be removed based on at least one of:
a lapse in time after the emergency call is transmitted;
a lapse in time after the emergency call ends;
input received from the user device; or
input received from the emergency call device.

13. The computer-readable medium of claim 8, where the one or more instructions to determine the temporary originating telephone number include:
one or more instructions that, when executed by the processor, cause the processor to:
receive the temporary originating telephone number from an external device; and
where the instructions further comprise:
one or more instructions that, when executed by the processor, cause the processor to:
determine that the association, between the device identifier and the temporary telephone number, is to be removed; and
notify the external device that the association between the device identifier and the temporary originating telephone number is to be removed based on determining that the association is to be removed.

14. The computer-readable medium of claim 8, where the one or more instructions to detect the emergency call from the user device include:
one or more instructions that, when executed by the processor, cause the processor to:
detect emergency call information including at least one of:
information that identifies a device type associated with the user device;
information that identifies a location associated with the user device;
information that identifies a user associated with the user device,
information that identifies a time associated with the emergency call; or
information that identifies a date associated with the emergency call; and
where the one or more instructions to transmit the emergency call include:
one or more instructions that, when executed by the processor, cause the processor to:
transmit the emergency call based on the emergency call information.

15. A method, comprising:
detecting, by a device, an emergency call from a user device associated with a device identifier,
the device identifier including information that identifies the user device;
determining, by the device, that the user device is not associated with a user profile;
determining, by the device, that the user device is not associated with a valid originating telephone number based on the user device not being associated with the user profile;
transmitting, by the device, a request for a temporary originating telephone number;
receiving, by the device, a response, to the request, that identifies the temporary originating telephone number,
the temporary originating telephone number being one of a plurality of stored temporary originating telephone numbers;
storing, by the device, an association between the device identifier and the temporary originating telephone number; and
transmitting, by the device, the emergency call, with information identifying the temporary originating telephone number, to an emergency call device,
the temporary originating telephone number permitting the emergency call device to place a return call to the user device.

16. The method of claim 15, where the determining that the user device is not associated with the valid originating telephone number further comprises:
determining that a service provider account associated with the user device is not activated; and
determining that the user device is not associated with the valid originating telephone number based on the service provider account not being activated.

17. The method of claim 15, further comprising:
determining, by the device, that the association is to be removed; and
removing, by the device, the association based on determining that the association is to be removed.

18. The method of claim 17, where the determining that the association is to be removed further comprises:
determining that the association is to be removed based on at least one of:
a lapse in time after the emergency call is transmitted;
a lapse in time after the emergency call ends;
input received from the user device; or
input received from emergency call device.

19. The method of claim 15, where the detecting the emergency call from the user device further comprises:
detecting emergency call information including at least one of:
information that identifies a device type associated with the user device;
information that identifies a location associated with the user device;

information that identifies a user associated with the user device,
information that identifies a time associated with the emergency call; or
information that identifies a date associated with the emergency call; and
where transmitting the emergency call further comprises:
  transmitting the emergency call based on the emergency call information.

20. The method of claim 15, further comprising:
detecting the return call from the emergency call device, the return call being directed to the temporary originating telephone number;
determining the device identifier associated with the temporary originating telephone number; and
transmitting the return call, to the user device, based on the device identifier.

* * * * *